US008204497B2

(12) United States Patent
Huber et al.

(10) Patent No.: US 8,204,497 B2
(45) Date of Patent: *Jun. 19, 2012

(54) METHOD FOR TESTING A MOBILE RADIO DEVICE

(75) Inventors: Rolf Huber, Fuerstenfeldbruck (DE); Reiner Goetz, Haar (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 102 days.

This patent is subject to a terminal disclaimer.

(21) Appl. No.: 12/666,381

(22) PCT Filed: May 13, 2008

(86) PCT No.: PCT/EP2008/003813
§ 371 (c)(1),
(2), (4) Date: Dec. 23, 2009

(87) PCT Pub. No.: WO2009/000366
PCT Pub. Date: Dec. 31, 2008

(65) Prior Publication Data
US 2010/0197299 A1    Aug. 5, 2010

(30) Foreign Application Priority Data

Jun. 27, 2007  (DE) .................. 10 2007 029 717
Feb. 21, 2008  (DE) .................. 10 2008 010 299

(51) Int. Cl.
*H04W 88/02* (2009.01)
(52) U.S. Cl. .................................................. 455/423
(58) Field of Classification Search .......... 455/423, 455/455
See application file for complete search history.

(56) References Cited

U.S. PATENT DOCUMENTS

2002/0035633 A1 * 3/2002 Bose et al. ............ 709/230
2010/0190451 A1 * 7/2010 Huber et al. ............ 455/67.14

FOREIGN PATENT DOCUMENTS

DE    195 17 393 C1    10/1996

OTHER PUBLICATIONS

Anritsu Corporation, "MD8470A Signalling Tester", Apr. 2005, pp. 1-12.
Anritsu Corporation, "ME7876A Mobile Communication Test System", Jan. 1, 2006, pp. 1-20.
Anritsu Corporation, Product Introduction MT8510B Service Tester, Jun. 2005, pp. 1-14.
Goetz, Reiner, "R&S CRTU Protocol Test Platform User-friendly definition of 2G and 3G signaling scenarios", News from Rohde & Schwarz, No. 193, Jun. 25, 2007, pp. 1-3.
International Search Report, WO 2009/000366 A1, Nov. 6, 2008, pp. 20-23.
International Preliminary Report on Patentability, PCT/EP2008/003813, May 3, 2010, pp. 1-6.

* cited by examiner

*Primary Examiner* — Diane Mizrahi
(74) *Attorney, Agent, or Firm* — Ditthavong Mori & Steiner, P.C.

(57) ABSTRACT

A reproducible method for testing mobile radio devices in different tolerant test modes by generating an instruction sequence that can be programmed or that can be obtained from measurement data, for controlling a protocol test that simulates a mobile radio network and that sends signals to the mobile radio device and tolerates allowable deviations of the received response signals of the mobile radio device according to mobile telephony standards in the tolerant mode while keeping a protocol of the unacceptable deviations as errors, and that terminates the test upon ever deviation in the strict mode and outputs the protocol on an output device once the test is finished.

20 Claims, 3 Drawing Sheets

METHOD FOR TESTING A MOBILE RADIO DEVICE

CROSS-REFERENCE TO RELATED APPLICATION

The present application is a national phase application of PCT Application No. PCT/EP2008/003813, filed on May 13, 2008, and claims priority to German Application No. DE 10 2007 029 717.5, filed on Jun. 27, 2007, and German Application No. DE 10 2008 010 299.7, filed on Feb. 21, 2008, the entire contents of which are herein incorporated by reference.

BACKGROUND OF THE INVENTION

1. Field of the Invention

The invention relates to a method for testing a mobile-radio device.

2. Discussion of the Background

From the prior art, methods are known, with which mobile-radio devices can be tested by measuring and recording the mobile-radio data of the mobile-radio networks and the real conditions within a so-called field test. The interoperability, the interplay between mobile-radio device and the base stations of one or more radio networks in a rented test network or in the real field are tested. The recorded data of the transmission and response signals of the base stations and of the mobile-radio device are converted into an instruction language for the control of a signal generator as the test device. Within a test environment, with the assistance of a simulation device, the signal generator, which converts the instruction sequences of the instruction language back into radio signals, a mobile-radio network is simulated. With this instruction language, new scenarios can be developed in a laboratory environment.

Tests are run to determine whether the mobile-radio device responds to the transmitted signals of the simulated base stations as anticipated according to the mobile-radio standard. The disadvantage with the prior art is that only precisely the mobile-radio device, which was used to determine the test scenario in a real mobile-radio network for recording the signals between the base station and the mobile-radio device, can be tested in the simulation.

If another model transmits not exactly the same response signals to the simulated base stations, as the mobile-radio device used, for example, in a test run for logging the signals and response signals, there are deviations from the signals anticipated according to the protocol, and it is not possible to distinguish whether the tested mobile-radio device is actually responding incorrectly with regard to the mobile-radio standard, or whether the deviation only corresponds to the type of the mobile-radio device, but is a deviation acceptable with regard to the mobile-radio standard used. For example, it can be that the sequence of the response signals in the mobile-radio device X is other than in the case of the mobile-radio device Y and, in spite of this, both mobile-radio devices X and Y behave correctly according to the mobile-radio standard, that is to say, respond to signals of the base station with conventional response signals.

SUMMARY OF THE INVENTION

Embodiments of the present invention provide a method, which can test mobile-radio devices of different types, which can deviate from one another in their response signals.

In a first step, an instruction sequence and anticipated response signals are generated, which may be programmed or can be derived from a conversion of measured signals. In a second step, a first or second tolerance mode is selected, wherein the first is a tolerant mode and the second is a strict mode. In a third step, through the execution of the instruction sequence, a test device, which simulates a mobile-radio network, in which signals are transmitted to the mobile-radio device, is controlled. In a fourth step, the test device receives response signals of the mobile-radio device. In the fifth step, the test device checks whether the response signals comply with the anticipated response signals. In a sixth step, if the test device detects a deviation of the response signals from the anticipated response signals in the first, tolerant mode, the test device checks whether this is an acceptable deviation with regard to the mobile-radio standard used. In the tolerant mode, the method is continued, if the deviation is recognised as acceptable. By contrast, in the strict mode, the simulation is terminated, if a deviation is established.

BRIEF DESCRIPTION OF THE DRAWINGS

A preferred embodiment of the invention is explained in greater detail below with reference to the drawings. The drawings are as follows.

DETAILED DESCRIPTION OF EXEMPLARY EMBODIMENTS OF THE INVENTION

Figure 1:
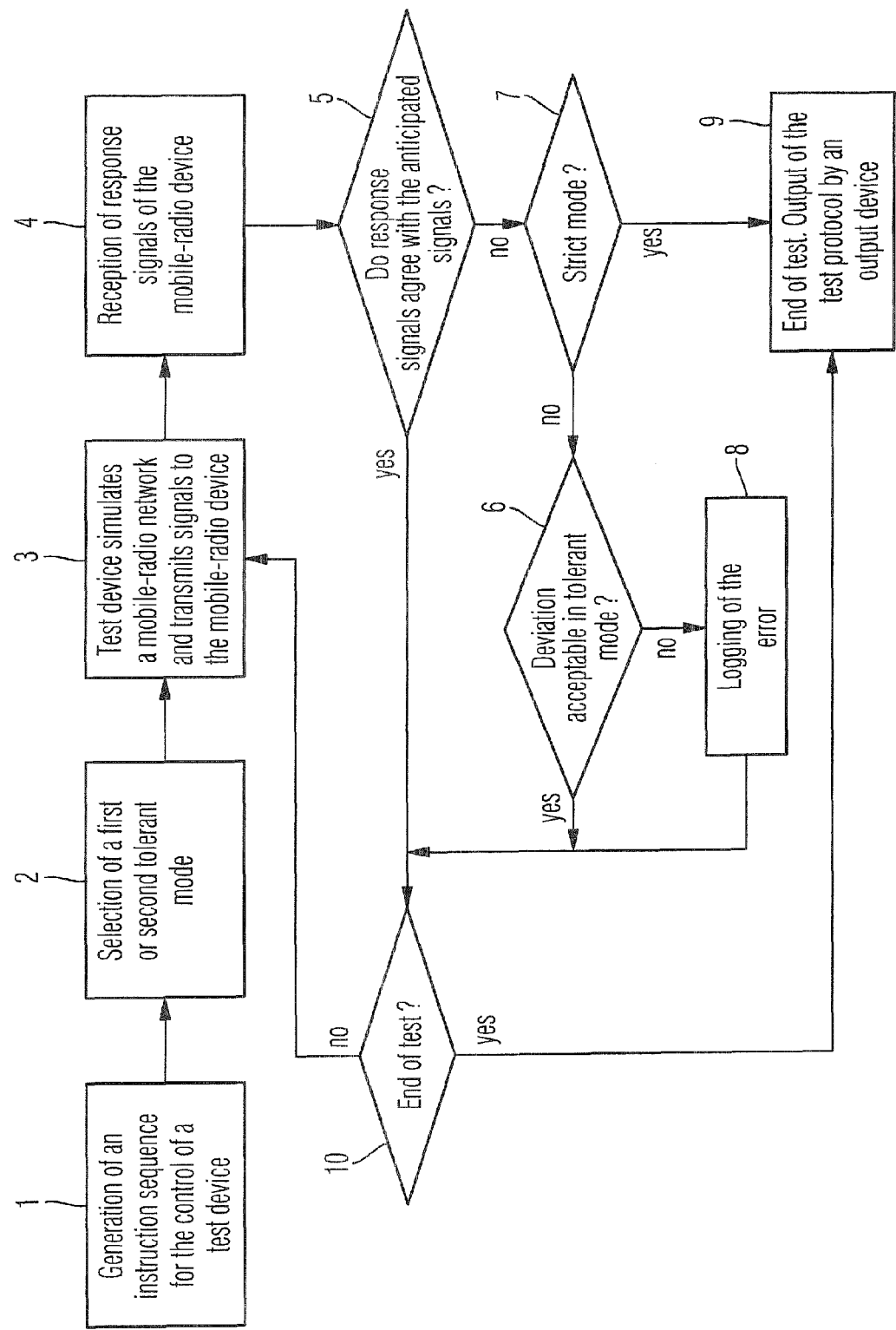
FIG. 1 shows the method of the invention according to claim 1.

In the following section, the method according to the invention for tolerant testing of a mobile-radio device is explained in greater detail with reference to FIG. 1. A mobile-radio device is to be tested with a test device. The test device is preferably a protocol tester with a signal generator, which simulates a mobile-radio network. In order to simulate the mobile-radio network, the protocol tester requires an instruction sequence, which controls it in such a manner that signalization messages, which allow a connection with the mobile-radio device under test (DUT) to be set up, are generated and transmitted through the signal generator. In a first step, a device generates this instruction sequence. This instruction sequence can be obtained from measured data, or it can have been programmed. At the same time, anticipated response signals are generated. These are taken in a particularly simple manner by logging a real network situation by means of a prepared mobile-radio device. Within the context of the present invention, any mobile-radio device, which can output via a further interface information regarding messages, which are transmitted to the base station or received from the same during operation via the radio interface, is understood as the prepared test mobile-radio device or prepared mobile-radio device.

In a second step, a mode is selected, according to which the deviations of the response signals received from the mobile-radio device under test are compared with the anticipated response signals: even if mobile-radio devices of extremely divergent models all behave in conformity with one mobile-radio standard, their response signals can deviate from one another. For example, the sequence of response signals, which a mobile-radio device of type X transmits, can be different from those which a mobile-radio device of type Y transmits. Such deviations can be acceptable, provided the requirements for sequence and content, which the respective mobile-radio standard defines, are observed. Now, there are two modes, through which the mobile-radio device can be tested: a so-called strict mode allows no deviation of the response signals. The test is interrupted, as soon as a response signal deviates from the anticipated response signal. The response signals must agree in content and sequence with the sequence of anticipated response signals.

In the first, so-called tolerant mode, given deviations are acceptable, so long as they are correct according to the mobile-radio standard, preferably GSM or UMTS. Acceptable deviations are preferably specified through parameter ranges and/or through message contents. Response signals, which the base stations can interpret correctly according to the mobile-radio standard, are acceptable. A databank, which contains the acceptable response signals and information regarding content and sequence, is stored within the test device. Accordingly, a comparison of the response signals actually generated by the DUT with the mobile-radio standard is possible, and acceptable deviations can be recognised as such. For example, the mobile-radio device can respond to a transmission sequence of the base stations with three different acceptable sequences of signals: A-B-C-D, B-A-D-C, C-B-D-A.

Those are, for example, the acceptable sequences of the response signals, which are known to the protocol tester. If the mobile-radio device does not now respond with one of these acceptable sequences, but it responds, for example, with D-C-A-B, this is an error of the mobile radio. The protocol tester preferably logs this error in the current simulation.

There can also be deviations in the timing. For example, while a mobile-radio device X responds to a received signal sequence with a response signal only after the time Tx, another mobile-radio device Y responds only after the time Ty. This response time T can be different according to the mobile-radio standard. For example, a time range [T1 ... T2] with a minimal response time T1 and a maximal response time T2, in which the mobile-radio device must respond to given transmitted signals, is acceptable. If the response time is disposed outside this range, an error is logged and the test is terminated.

A further deviation can also be the message content itself. For example, if the message is transmitted from the mobile-radio device to the base station that x errors last occurred in the communication, in the tolerant mode, this number can deviate from the number of errors indicated in the anticipated response signal. The mobile-radio standard allows deviating message contents to given transmitted signal sequences, for example, a range from [x1 ... x2]. It is therefore acceptable for the message to provide a minimum of "x1 errors" and a maximum of "x2 errors". If the number of errors is disposed outside this range, an error is logged.

In a third step, a test device simulates the mobile-radio network and transmits signals to the mobile-radio device. In a fourth step of the method, the protocol tester receives the response signals of the mobile-radio device. In the fifth step, the protocol tester checks whether the received response signals comply with the anticipated response signals. If they comply, the protocol tester inquires whether the instruction sequence has been worked through, then the test is terminated. If they do not comply, the protocol tester checks whether the second, strict mode has been set. If yes, in the eighth step, the test is ended and the test protocol is output by an output device, preferably a software program.

By contrast, if the tolerant mode is active, a check is implemented in the sixth step to determine whether the existing deviation is acceptable. If no, the error is also logged by the protocol tester. Alternatively, it can also be logged, if an acceptable deviation from the anticipated response signals has occurred. If yes, interrogation 10 enquires whether the instruction sequence has been worked through. If yes, the test is terminated, and the test protocol is output. Otherwise, the test is continued with the processing of the next instruction line in step 3.

Figure 2:
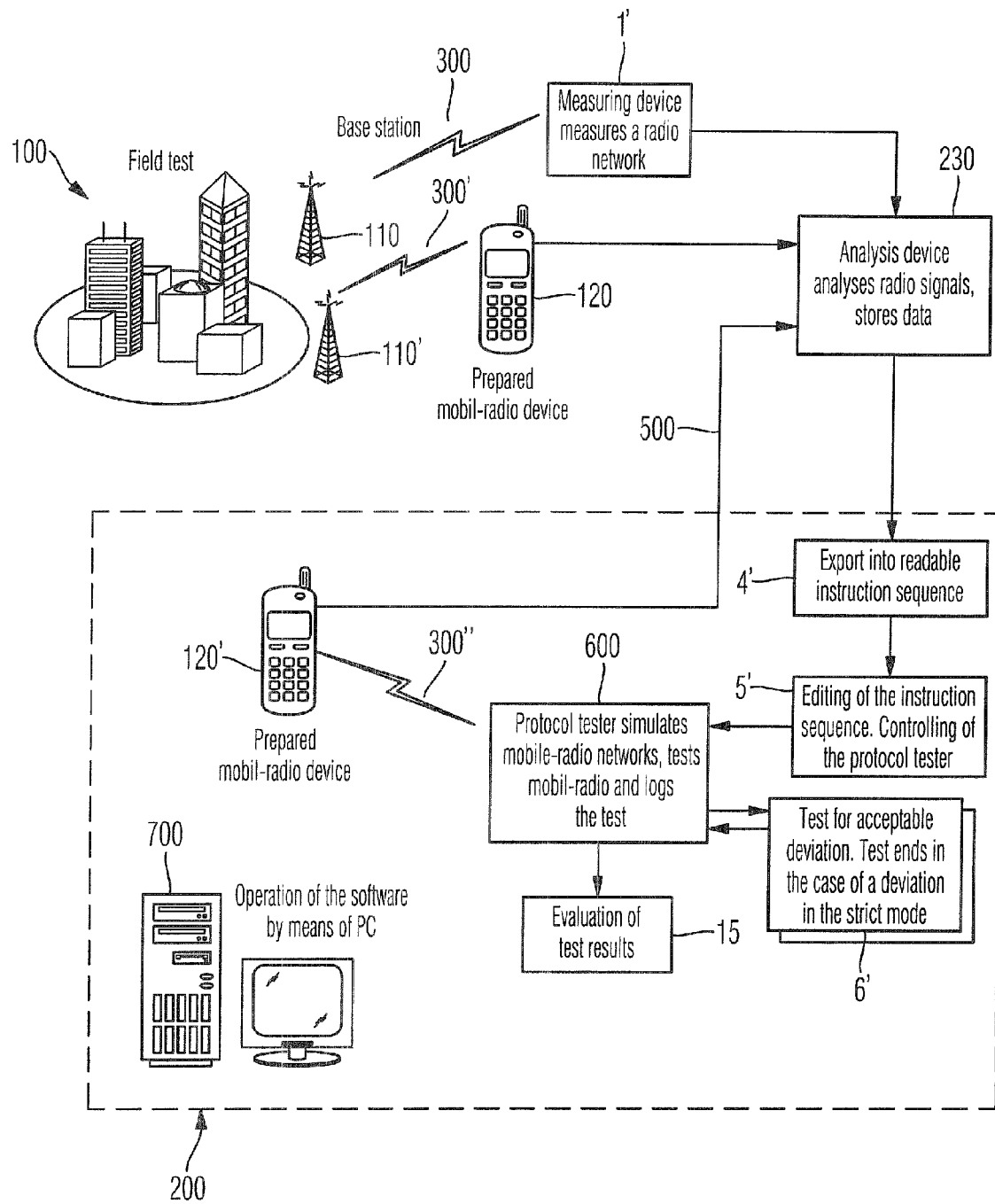
FIG. 2 shows an overview of the entire implementation of a mobile-radio test and an application of the method according to the invention contained therein.

In FIG. 2, an overview of the entire mobile radio test is presented in its substantial procedure in the form of functional blocks. The method according to the invention used therein is highlighted in white in FIG. 2 as block 6'. In a field test, several base stations 110 of one or more mobile-radio networks are disposed in a real environment. A prepared mobile-radio device 120 transmits response signals to signals received in the downlink from one of the base stations 110. Signals of the other base stations, for example, of adjacent cells are superimposed on these radio signals, exchanged between the mobile-radio device 120 and a base station for the information transmission.

The signals of these base stations 110 and the response signals, which the mobile-radio device 120 transmits are measured and recorded by a measuring device 1', for example, a network scanner and the prepared mobile-radio device 120. The prepared mobile-radio device 120 indicates its transmitted and received response signals and associated signals to an analysis device 230. Similarly, the measuring device 1' routes the signals received by it to the analysis device 230. The analysis device 230 analyzes the signals of the radio connections 300 and 300' and stores the data obtained from them. In this context, by contrast with the prepared mobile-radio device 120, the measuring device can also determine information regarding such mobile-radio networks, in which no information regarding the mobile-radio device 20 is available.

In the example described, the starting point is the recording of a real network environment. However, a laboratory interoperability test or a synthetic network environment created elsewhere can equally be the basis for a generation of an instruction sequence.

The data are exported from the analysis device 4', converted into a readable instruction sequence and anticipated response signals and stored in a format executable by the protocol tester. A software 5' allows the editing of the instruction sequence and the configuration of the software, whether the device under test 120' is to be tested in the instruction sequence in the strict mode and/or in the tolerant mode. The protocol tester 600 is controlled with the instruction sequence obtained in this manner. In this context, the instruction sequence need not originate exclusively from the analysis device, but can itself be programmed, for example, by adding further instructions. The protocol tester 600 executes the instructions and accordingly reproduces the transmitted signals of the downlink of at least one base station of a mobile-radio network. The mobile-radio device under test 120' can deviate from the mobile-radio device 120 used in the field test. The protocol tester 600 transmits the signals to the mobile-radio device 120'. The mobile-radio device 120' responds with response signals. In the method according to the invention, see block 6' in FIG. 2, a check is now implemented regarding whether the mobile-radio device 120' transmits the anticipated response signals. In this context, in the first, tolerant mode, the response signals of the mobile-radio device can deviate from the anticipated response signals. Anticipated response signals are response signals, which result from the logged behaviour of the prepared mobile-radio device. These are inserted into the instruction sequence with the correct timing during the logging of the radio connection. During the replay of the instruction sequence, the tester waits for the arrival of the anticipated signals, before the instruction sequence is worked through any further. According to the mobile-radio standard, it indicates acceptable deviations and unacceptable deviations from the anticipated signals. In the tolerant mode, the protocol tester logs unacceptable deviations as errors and terminates the test.

In the case of acceptable deviations, the test is continued until the end of the instruction sequence is reached. Following this, the protocol tester 600 outputs the test protocol on an output device, after which, for example, a software 15 evaluates the test protocol. By contrast, in the strict mode, the test is immediately terminated after the first deviation from the anticipated response signal.

Figure 3:
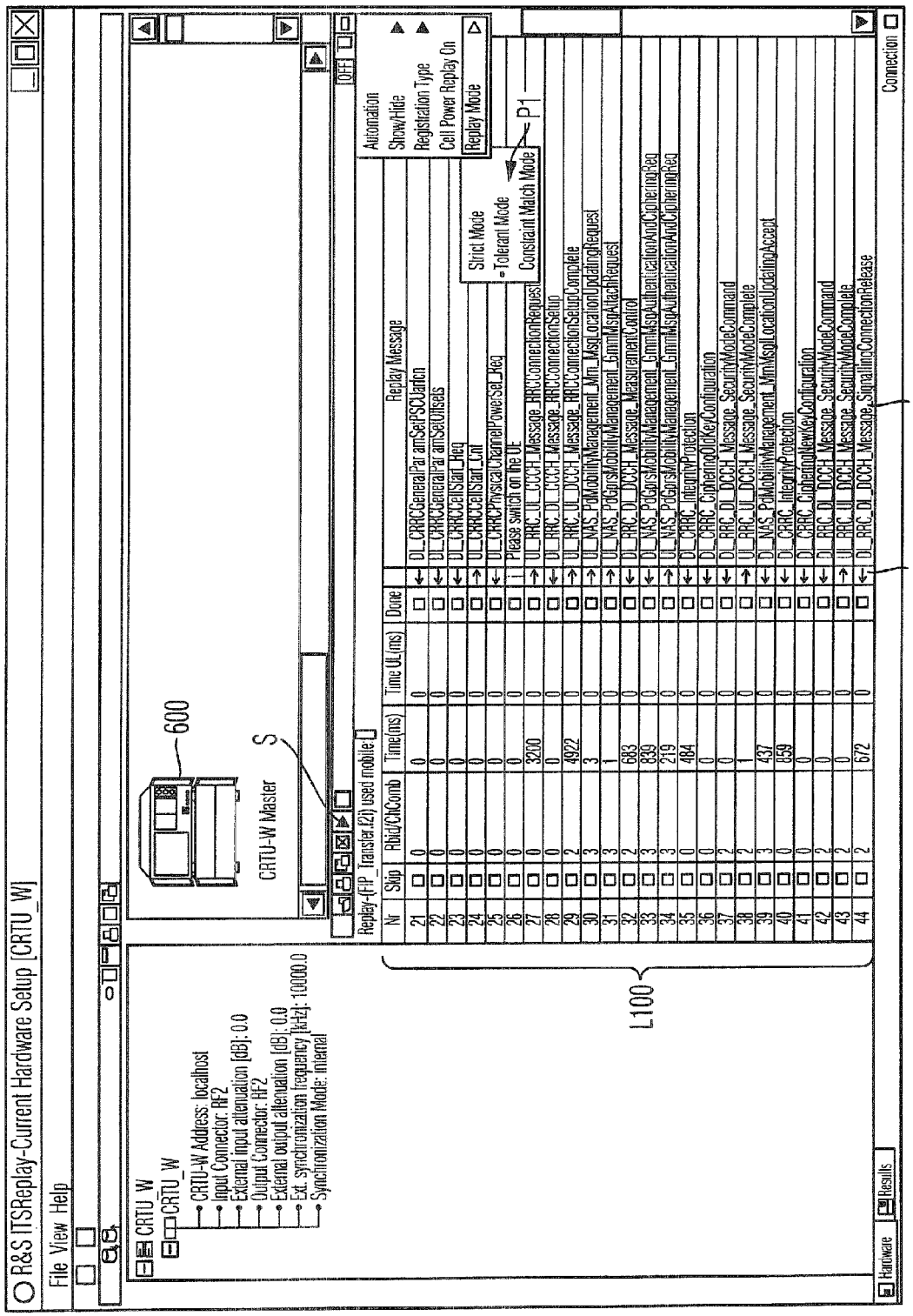
FIG. 3 shows a graphic user surface for the configuration of the test, in particular, for setting the strict or tolerant mode, and for editing the instruction sequences.

FIG. 3 presents the user surface of the software, with which instruction sequences can be edited and programmed for the control of the protocol tester 600. With the software, instruction sequences and anticipated response signals can be loaded into the list L100 and edited. The instruction sequence originates from an export of measured data in a format, which the protocol tester 600 can read and execute, wherein the individual instructions in this user surface can also be programmed and therefore edited. In the list L100, one instruction of the instruction sequence is listed per line. Alongside the executable instructions, the list also contains information regarding the anticipated response signals in the form of uplink messages. The columns L7 and L8 are primarily relevant for the method according to the invention. The column L7 indicates with arrow symbols whether an uplink message or a downlink instruction is involved: for an uplink instruction, the graphic symbol "arrow right" appears, and in the case of a downlink instruction, the graphic symbol "arrow left" appears. In this context, it must be remembered that only the downlink instructions are actually executed. By contrast, the uplink messages correspond to the anticipated response signals of the mobile-radio device under test.

The column L8 finally shows the instructions themselves, which are editable. Instructions can be deleted, amended, added and moved. It is also possible to cut out a part from a listed instruction sequence including the anticipated response signals and to start only this cut-out instruction sequence via the start button S.

For every individual uplink, it is possible to set, via a pop-up menu P1, whether this uplink is to be tested in the tolerant mode or in the strict mode. The editing can also be implemented by means of a separate program, which is called up when selecting the instruction to be amended.

The method according to the invention is not restricted to the exemplary embodiment presented. In particular, individual combinations of features are also advantageously possible. Furthermore, reference is made to the fact that the patterns presented in FIGS. 1-7 are provided merely for the purpose of illustration.

The invention claimed is:

1. A method for testing a mobile-radio device with the following method steps:
    generating an instruction sequence for the control of a test device and anticipated response signals that are expected to result from the testing;
    selecting a first or a second tolerance mode;
    simulating a real mobile-radio network by executing the instruction sequence for the control of a test device and transmitting signals to the mobile-radio device;
    receiving uplink-messages using response signals of the mobile-radio device;
    checking the uplink messages of the response signals with regard to being in accordance with anticipated response signals;
    within a first, tolerant mode in which the response signals can deviate from the anticipated response signals by specified acceptable deviations, checking whether the response signals deviate from the anticipated response signals by the acceptable deviations and continuing the test in a case that the response signals deviate from the anticipated response signals by the acceptable deviations; and
    within a second, strict mode in which the response signals cannot deviate from the anticipated response signals, terminating the test in the case that the response signals deviate from the anticipated response signals.

2. The method according to claim 1,
wherein, in the case that the response signals deviate from the anticipated response signals, the deviation is logged.

3. The method according to claim 2,
wherein, within the first, tolerant mode, in a case that the response signals deviate from the anticipated response signals by an unacceptable deviation, which is a deviation that is other than the acceptable deviations, the test is terminated and the unacceptable deviation is logged.

4. The method according to claim 2,
wherein information about at least one real mobile-radio network and a mobile-radio device is recorded using a measuring device, and this information is converted into an instruction sequence for the provision of a test scenario.

5. The method according to claim 2,
wherein the given instruction sequence is programmed for the provision of a test scenario.

6. The method according to claim 2,
wherein the acceptable deviations within the tolerant mode are defined through parameter ranges.

7. The method according to claim 2,
wherein acceptable deviations within the tolerant mode are defined on the basis of a mobile-radio standard through given message contents.

8. The method according to claim 1,
wherein, within the first, tolerant mode, in a case that the response signals deviate from the anticipated response signals by an unacceptable deviation, which is a deviation that is other than the acceptable deviations, the test is terminated and the unacceptable deviation is logged.

9. The method according to claim 8,
wherein information about at least one real mobile-radio network and a mobile-radio device is recorded using a measuring device, and this information is converted into an instruction sequence for the provision of a test scenario.

10. The method according to claim 8,
wherein the given instruction sequence is programmed for the provision of a test scenario.

11. The method according to claim 8,
wherein the acceptable deviations within the tolerant mode are defined through parameter ranges.

12. The method according to claim 8,
wherein acceptable deviations within the tolerant mode are defined on the basis of a mobile-radio standard through given message contents.

13. The method according to claim 1,
wherein information about at least one real mobile-radio network and a mobile-radio device is recorded using a measuring device, and this information is converted into an instruction sequence for the provision of a test scenario.

14. The method according to claim 13, wherein parameter ranges are given through a quantity of sequences of response signals of the mobile-radio device applicable according to a mobile-radio standard.

15. The method according to claim 13, wherein the acceptable deviations within the tolerant mode are defined through parameter ranges.

16. The method according to claim 1, wherein the given instruction sequence is programmed for the provision of a test scenario.

17. The method according to claim 16, wherein the acceptable deviations within the tolerant mode are defined through parameter ranges.

18. The method according to claim 1, wherein the acceptable deviations within the tolerant mode are defined through parameter ranges.

19. The method according to claim 18, wherein the parameter ranges are time intervals, which are defined through a minimal response time and a maximal response time, after which the mobile-radio device responds to a synchronization message of one or more base stations.

20. The method according to claim 1, wherein acceptable deviations within the tolerant mode are defined on the basis of a mobile-radio standard through given message contents.

* * * * *